United States Patent
Corten

(10) Patent No.: US 9,797,368 B2
(45) Date of Patent: Oct. 24, 2017

(54) WIND TURBINE WITH LOW INDUCTION TIPS

(75) Inventor: Gustave Paul Corten, Alkmaar (NL)

(73) Assignee: CORTENERGY BV, Alkmaar (NL)

( * ) Notice: Subject to any disclaimer, the term of this patent is extended or adjusted under 35 U.S.C. 154(b) by 358 days.

(21) Appl. No.: 13/119,739

(22) PCT Filed: Sep. 18, 2009

(86) PCT No.: PCT/NL2009/000184
§ 371 (c)(1),
(2), (4) Date: Mar. 18, 2011

(87) PCT Pub. No.: WO2010/033018
PCT Pub. Date: Mar. 25, 2010

(65) Prior Publication Data
US 2011/0176926 A1    Jul. 21, 2011

(30) Foreign Application Priority Data
Sep. 19, 2008   (NL) .................................. N2002002

(51) Int. Cl.
*F03D 1/06* (2006.01)

(52) U.S. Cl.
CPC ...... *F03D 1/0608* (2013.01); *F05B 2240/301* (2013.01); *Y02E 10/721* (2013.01)

(58) Field of Classification Search
CPC ...... F03D 1/0641; F03D 1/065; F03D 1/0608; F05B 2240/301
USPC ............................................. 416/241 R, 223
See application file for complete search history.

(56) References Cited

U.S. PATENT DOCUMENTS

| | | | |
|---|---|---|---|
| 3,578,264 A | 5/1971 | Kuethe | |
| 4,674,717 A | 6/1987 | Loebert | |
| 4,976,587 A | 12/1990 | Johnston et al. | |
| 5,474,425 A * | 12/1995 | Lawlor | .............. 416/223 R |
| 5,734,990 A | 4/1998 | Waring | |
| 6,072,245 A | 6/2000 | Ockels | |
| 6,503,058 B1 | 1/2003 | Selig et al. | |
| 6,910,867 B2 | 6/2005 | Corten | |
| 7,299,627 B2 * | 11/2007 | Corten et al. | .................. 60/398 |
| 7,357,622 B2 | 4/2008 | Corten et al. | |
| 7,585,157 B2 | 9/2009 | Quell et al. | |
| 7,914,261 B2 | 3/2011 | Wobben | |
| 2006/0131889 A1 | 6/2006 | Corten et al. | |
| 2006/0232073 A1 | 10/2006 | Corten et al. | |
| 2006/0280614 A1 | 12/2006 | Quell et al. | |

(Continued)

FOREIGN PATENT DOCUMENTS

| | | |
|---|---|---|
| EP | 0845580 | 6/1998 |
| EP | 1152148 A1 | 11/2001 |

(Continued)

OTHER PUBLICATIONS

International Search Report for PCT/NL2009/000184, Completed by the European Patent Office dated Dec. 22, 2010, 3 Pages.

(Continued)

*Primary Examiner* — Gregory Anderson
*Assistant Examiner* — Eldon Brockman
(74) *Attorney, Agent, or Firm* — Brooks Kushman P.C.

(57) ABSTRACT

A wind turbine having a rotor blade geometric design which reduces blade loads in particular, blade root bending moments, tilt moments and yaw moments.

13 Claims, 2 Drawing Sheets

(56) References Cited

U.S. PATENT DOCUMENTS

Figure 1:
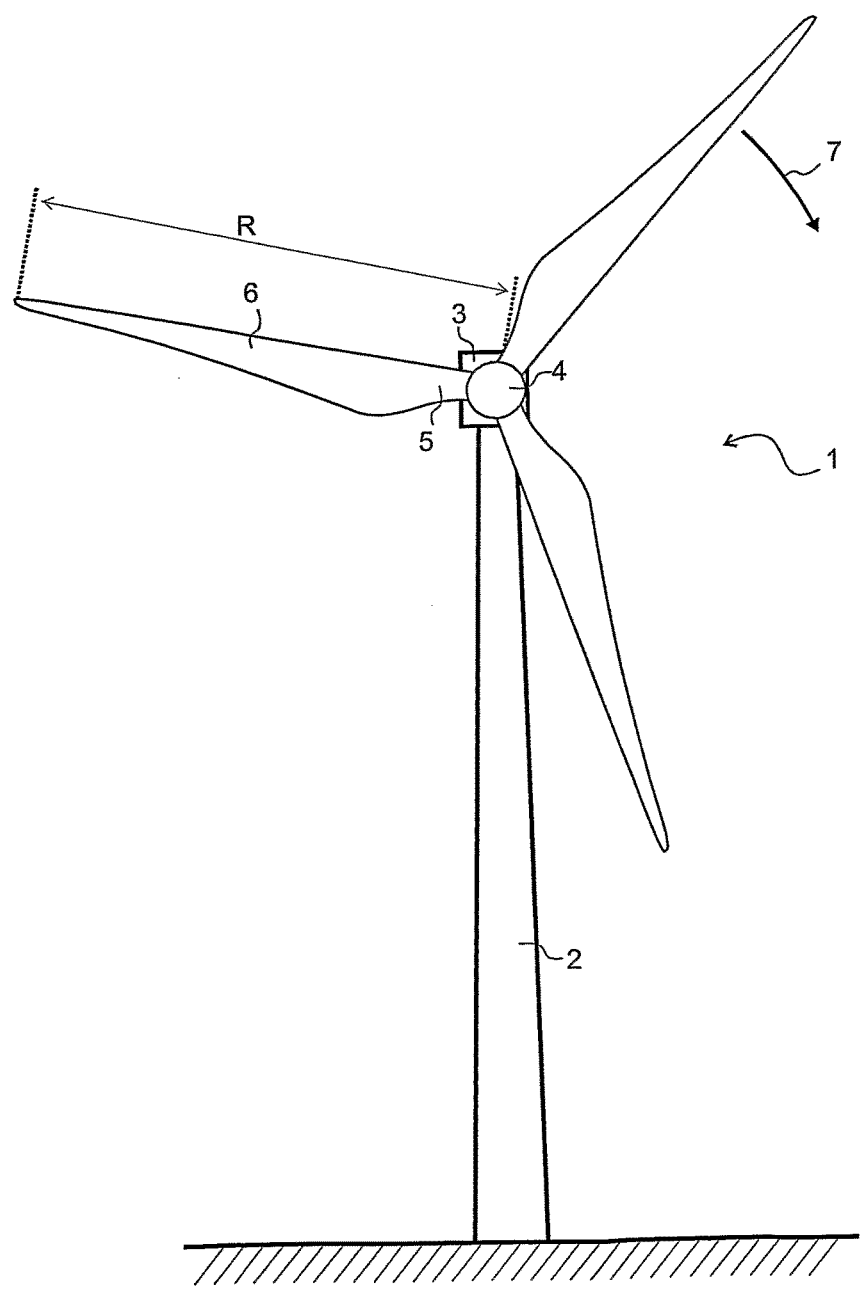

| | | |
|---|---|---|
| 2007/0036657 A1 | 2/2007 | Wobben |
| 2008/0206055 A1 | 8/2008 | Godsk et al. |
| 2009/0074574 A1 | 3/2009 | Godsk et al. |
| 2009/0263252 A1 | 10/2009 | Slot |
| 2011/0064578 A1* | 3/2011 | Bertolotti ............... F03D 1/00 416/131 |

FOREIGN PATENT DOCUMENTS

| | | |
|---|---|---|
| EP | 1845258 | 10/2007 |
| GB | 2265672 | 10/1993 |
| NL | 1012949 | 3/2001 |
| WO | 9011929 | 10/1990 |
| WO | 9201156 A1 | 1/1992 |
| WO | 0015961 | 3/2000 |
| WO | 03067169 | 8/2003 |
| WO | 2004078465 | 9/2004 |
| WO | 2004097215 A1 | 11/2004 |
| WO | 2005035978 | 4/2005 |
| WO | 2006090215 A1 | 8/2006 |
| WO | WO 2007114698 A2 * | 10/2007 |
| WO | WO 2008113350 A3 * | 2/2009 |

OTHER PUBLICATIONS

Erich Hau, "Windkraftanlagen: Grundlagen, Technik, Einsatz, Wirtschaftlichkeit", Translation: "Wind-power plants: Bases, technology, employment, economy", Chapter 5: Aerodynamik Des Rotors, Translation: Aerodynamics of the rotor, 1996, 8 Pages, p. 113-118.

Corten, "Flow Separation on Wind Turbine Blades", Dissertation University of Utrecht 2001, p. 7-16, 11 Pages.

Sharpe, Wind Turbine Aerodynamics, Wind Energy Conversion Systems, 1990, pp. 54-58, Freris, L.L., Great Britain.

Mejia et al. Renewable Energy 2006, vol. 31, p. 383-399, "Simulation of wind energy output at Guajira, Colombia."

\* cited by examiner

WIND TURBINE WITH LOW INDUCTION TIPS

CROSS-REFERENCE TO RELATED APPLICATION

This application is the U.S. national phase of PCT Appln. No. PCT/NL2009/000184 filed Sep. 18, 2009 which claims priority to Netherlands application NL N2002002 filed Sep. 19, 2008, the disclosures of which are incorporated in their entirety by reference herein.

The invention relates to the distribution of the chord along the span of a rotor blade of a horizontal axis wind turbine.

The state of the art blades of wind turbines have the disadvantage of producing high loads which increase the costs of wind energy. In particular the bending moments at the blade roots are high. Those loads increase costs of the blade root area, the hub, the pitch bearings, etc. When the root bending moments of the blades of the same rotor are not equal, high yaw and tilt moment will be exerted on the hub, the nacelle, the tower and the foundation. Another disadvantage of the high loading of the blades is that the turbine will produce a large wind speed deficit in the wake. In a wind farm, turbines located in such wakes experience high loading, particularly in the case of partial wake operation. Furthermore the production of high wind speed deficits in wind farms will reduce the overall wind farm efficiency according to the concept Heat & Flux for which reference is made to section 2.1.2 in "Flow Separation on Wind Turbine Blades", ISBN 90-393-2582-0 or US 7357 622 B2. All mentioned loads are particularly high at about rated wind speed of the turbine, which is the minimum wind speed at which the turbine can produce its maximum power. Another disadvantage of existing blades is that measures have to be taken to avoid that the tips hit the tower as a result of an extreme gust. Such measures are the use of pre-bent blades, the use of additional glass fibres, increasing the airfoil thickness or replacing glass fibres by stiffer types of glass fibres or by carbon fibres.

In addition, state of the art blades experience also high loads under extreme conditions. E.g. when the turbine is halted, during an extreme gust, the loads all the way from the blades to the foundations can be very high and will add to the cost of the turbine.

At about rated wind, a known method to alleviate the loads is called peak shaving. Here the blades are pitched some degrees to vane, so that the lift produced by the blades is reduced. This method does reduce some loads, however not with certainty: the blades still may develop the high lift when the wind direction changes in a gust or when the control system fails and the blade is pitched in the wrong direction. Many active methods exist to alleviate loads such as changing the shape of the airfoils or using active actuators to control airfoil aerodynamics. Those methods however increase the frequency of maintenance and thus the costs. And even when an active control successfully reduces loads in 99.9% of time, the very rare case of control errors may lead to an increase of the highest loads. Wind turbine designers have to account for such cases. Both peak shaving and said active methods have no or little effect on extreme loads when the turbine is halted. Another known method to reduce loads is to optimise the rotor to an axial induction below the optimum value of $a=\frac{1}{3}$ derived by Lanchester in 1915 and often call the Betz limit.

The aim of the invention is to overcome the above mentioned disadvantages. Some definitions are introduced. The solidity is a function of the local radius r and is defined as $Nc/(2\pi R)$. Herein R refers to the rotor radius and Nc refers to the total chord length of all the blades at radial position r. A wind turbine may have blades of different lengths or may have blades which have multiple airfoils at a given radial position. In all cases Nc equals the sum of the chords of all airfoils at radial position r. The chord c at radial position r is defined as the smallest chord value in a range of width c around position r. When an airfoil is equipped with a flexible trailing edge, then parts which can flex during power generating conditions by more than 1% c should not be included in the chord c. The ratio of the solidity at a first radial position $r_1$ and a second radial position $r_2$ is expressed as $sol(r_1/r_2)$. The term fast runner type is meant to dedicate the invention to modern wind turbines with a total solidity of less than 0.1. The total solidity is defined as the sum of the projected areas of all rotor blades devided by the swept rotor area.

The aim of the invention is realised by a wind turbine rotor of more than 10 m diameter of the fast runner type which has a $sol(r_1/r_2)$ which is larger than a number denoted in the table below.

|  | sol (0.3R/0.5R) | sol (0.5R/0.7R) | sol (0.7R/0.9R) |
| --- | --- | --- | --- |
| preferred | 1.45 | 1.5 | 1.5 |
| more preferred | 1.5 | 1.6 | 1.65 |
| most preferred | 1.6 | 1.7 | 1.8 |

A blade shaped according to any of the above $sol(r_1/r_2)$ criteria has the following advantages:

At the tip speed ratio of about rated wind speed the axial induction induced by a rotor with such blades is close to 0.3 in the rotor centre and considerably lower at larger radial positions. So the centre is operated close to the optimum while the outer part is further away from that optimum. This reduces the loads on the blade tips and thus reduces the blade root bending moments as well as the tilt and yaw moments etc. Blade tip loads have a higher cost impact than blade root loads for two reasons: first the arm of the forces is larger and second the direction of the lift force is less tangential. Only the tangential component is what is harvested. At higher tips speed ratios used e.g. below rated wind speed the entire rotor can be operated close to the Lanchester-Betz optimum. A further benefit of an embodiment of the invention is that the above physics means that the power coefficient at lower wind speeds is relatively high so that a larger fraction of energy is produced at lower wind speeds. This is beneficial since the value of energy increases with decreasing wind, in particular in areas with much wind power generation. Another advantage is that the tips are operated close to their maximum lift so that a possible wind gust or control error can not much increase the loads. This gives blades according to the invention a passive overload protection. Another advantage of the reduced loads on the outer part of the blade is that it helps to keep the tip away from the tower. A further benefit is that a conventional rotor can be replaced by a rotor according to the invention with a larger diameter. The new rotor will have a higher yield at the same load level.

At the root end, classical blades are mainly optimised with regard to the structure and much less regarding aerodynamics. As a result the centre of the conventional wind turbine is a "leak" in the rotor disk: Air will flow through the rotor centre from the high pressure upwind side to the low pressure downwind side. This parasitic flow causes a power loss. When sol(0.1R/0.3R) is larger than 1.0 and particularly larger than 1.2 and more in particular larger than 1.4, at 0.1R sufficient chord is available to aerodynamically close the rotor centre. For a particular embodiment according to the invention the induction is relatively high in the rotor centre and therefore closing the centre adds more yield than in the case of conventional rotors. Furthermore closing the leak means that more power is generated in the rotor centre, which is the power giving the smallest bending moments.

Further benefit is obtained when the 4 different $sol(r_1/r_2)$ ratios are larger than the indicated values:
sol(0.3R/0.5R): 1.45; 1.5; 1.6,
sol(0.5R/0.7R): 1.5; 1.6; 1.7,
sol(0.7R/0.9R): 1.5; 1.65; 1.8,
sol(0.3R/0.9R): 2.0; 2.5; 3.0.

Further advantage is obtained when the chord as function of radial position is monotonously decreasing in at least 80% of the radial range between 0.3R and 0.99R.

According to one embodiment of the invention, the rotor is equipped with lift enhancing means. Further advantage is obtained when such lift enhancing means are applied at a radial position larger than 0.5R and more particularly larger than 0.7R and preferably larger than 0.9R. Lift enhancing means are changes to a smooth airfoil contour which increase the maximum lift coefficient and which are attached to the airfoil as separate elements or integrated with the airfoil. Examples of lift enhancing means are vortex generators, gurney flaps, air jets, boundary layer suction, micro electro mechanical devices, or airfoil surfaces with bultings or vaultings or ailerons. The lift enhancing means can be applied passively or can be used in an active way, being controlled as function of a calculated or measured parameter.

Further advantage is obtained when the local chord in the range between 0.5R and 0.9R is less than what follows from the equation C=M, assuming that the local lift coefficient $c_l$=0.9 and in particular $c_l$=1.0 and more in particular $c_l$=1.3 and preferably $c_l$=1.5. Herein $C=Nrc_lc_l\lambda/(2\pi R^2)$ is a dimensionless chord number and $M=-1.19+9.74C_p-21.01\ C_p^2+17.5C_p^3$ is a dimensionless momentum loss estimate derived from $C_p$, which is the electrical power coefficient of the turbine. The formula for M can be used in the case that $C_p$ is between 1/3 and 16/27.

When the rotor blades are operated at less than 80% of the rated wind speed, further advantage is obtained if the tip speed ratio (defined as $\lambda=\omega R/V$, wherein $\omega$ is the rotor angular speed and V the wind speed) of the rotor is higher than that at rated wind speed by at least 10%, in particular by at least 20% and more in particular by at least 30%. More in particular the wind turbine is operated at constant rotor speed, so that the tip speed ratio automatically increases with decreasing wind speed. Constant rotor speed turbines are defined as turbines which have a connection between the generator and the grid wherein the energy is not transferred via a AC-DC-AC voltage link. At wind speeds of less than 80% of rated wind the loadings are relatively low and do not cause high costs. By increasing the tip speed ratio the entire rotor can operate close to the Lanchester-Betz limit so that the maximum power is captured.

Another advantage is valid for the efficiency of wind farms. If the wake of a turbine in a farm is hindering downwind turbines, said turbine can be operated at a lower tip speed versus wind speed curve compared to turbines which wakes are not hindering. As a result the farm efficiency increases and the turbine loading is reduced. The tip speed ratio of a turbine is implicitly or explicitly controlled by a function or algorithm $\lambda(V)$ which provides the tip speed ratio $\lambda$ as function of wind speed V. If an upwind turbine in a farm is controlled by $\lambda_{up}(V)$ and a downwind turbine by $\lambda_{down}(V)$ then for some V, $\lambda_{up}(V)\leq\lambda_{down}(V)/f$, wherein f is 1.05 and in particular 1.1 and more in particular 1.15.

The above embodiments of the invention serve the aim to improve the ratio between yield and loads. This objective is of increasing importance with increasing turbine size. For a small turbine the additional materials to strengthen the structure have relatively low cost impact compared to design and maintenance costs. For large turbines however, the material savings associated with load alleviation are high. Therefore further advantage is obtained when the invention is applied to turbines of a diameter large than 80 m, in particular larger than 100 m and more in particular larger than 120 m. For turbines smaller than 10 m diameter the load reduction is of little importance and such turbines are not used in farms. Therefore turbines of less than 10 m diameter are excluded from the invention.

Further benefit is obtained when the wind turbine according to the invention comprises a blade with an airfoil at a radial position larger than 0.8R of which the maximum lift coefficient when any lift enhancing means are removed, under 2-dimensional conditions at a chord-based Reynolds number of 1.5 million, is larger than 1.4 and in particular larger than 1.5 and more in particular larger than 1.6 and preferably larger than 1.7.

And finally further benefit is obtained when the wind turbine according to the invention comprises a blade with an airfoil at a radial position larger than 0.6R of which the maximum lift coefficient including the lift enhancing means, under 2-dimensional conditions at a chord-based Reynolds number of 1.5 million, is larger than 1.6 and in particular larger than 1.7 and more in particular larger than 1.8 and preferably larger than 1.9.

The figures below show preferred embodiments of the invention.

Figure 2:
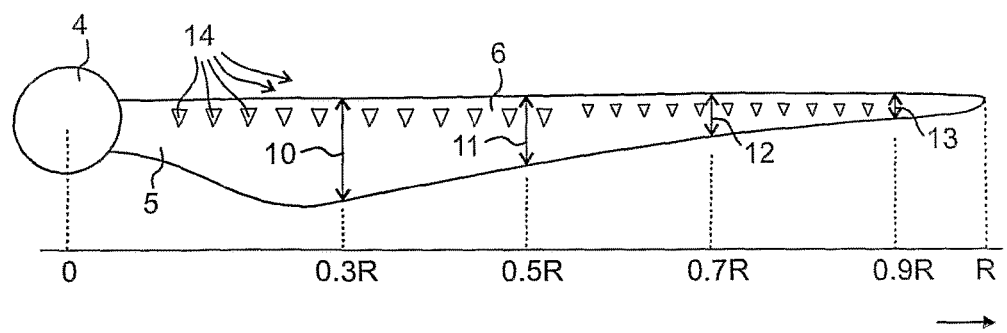
Figure 3:
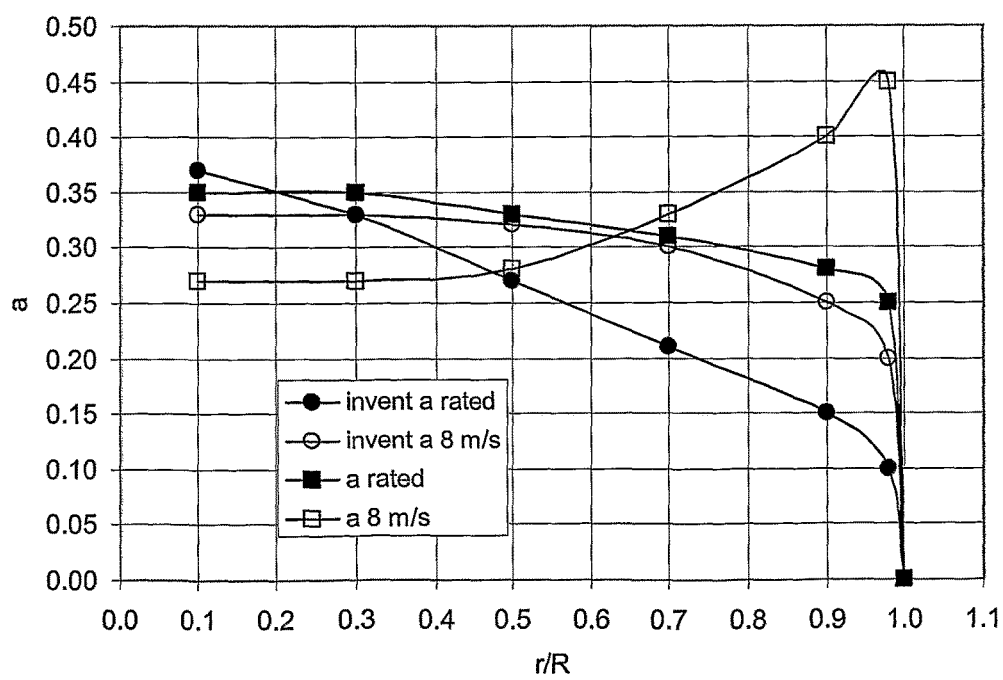

FIG. 1 wind turbine;

FIG. 2 wind turbine blade;

FIG. 3 induction distribution.

FIG. 1 shows a wind turbine 1 with a tower 2, a nacelle 3, a hub 4 and a blade 6 with blade root 5. The radius of the turbine is R. The distribution of the chord versus radial position is according to the invention. FIG. 2 shows the suction side of a blade 6 with blade root 5. The blade has local chords 10, 11, 12 and 13 at respectively 0.3R, 0.5R, 0.7R and 0.9R (0.1R is not made explicit in the figure). The blade has lift enhancing means in the form of vortex generators 14 which are shown on a larger scale and by smaller numbers for reasons of clarity. In the figure the chord 10 divided by the chord 11 equals sol(0.3R/0.5R) and is 1.5. FIG. 3 shows an example of the axial induction versus radial position for a rotor according to the invention at rated wind speed of 11 m/s (curve "invent a rated") and at 8 m/s wind (curve invent a 8 m/s). It can be seen that at rated the outer part of the rotor is rather far from a=1/3, while the inner part is still close to a=1/3. The relations for a state of the art design are shown by the curves "a rated" and "a 8 m/s". In this rated case the induction at the outer part of the rotor is much closer to a=1/3. Therefore, the state of the art rotor will have a higher power coefficient $C_p$ but experience higher loads. The rotor according to the invention can be made larger so that it captures even more energy at less loads. The precise induction values at the y-axis are not relevant and can be higher or lower. Relevant are the respective trends in the curves, which illustrate the principles behind the invention.

It will be obvious for the expert in the art that the figure and the description are just examples of the invention and that many variations are possible which are covered by the enclosed claims.

The invention claimed is:

1. A wind turbine of the fast runner type comprising:
a rotor having a diameter larger than 80 meters (m) wherein the ratio of the solidity at radial position 0.5 radius (R) to the solidity at radial position 0.7R is larger than 1.5.

2. The wind turbine according to claim 1 wherein the ratio of solidity at radial position 0.5R to the solidity at radial position 0.7R is larger than 1.6.

3. The wind turbine according to claim 1 wherein the ratio of solidity at radial position 0.5R to the solidity at radial position 0.7R is larger than 1.7.

4. The wind turbine according to claim 1 wherein the ratio of solidity at radial position 0.7R to the solidity at radial position 0.9R is larger than 1.65.

5. The wind turbine according to claim 1 wherein the ratio of solidity at radial position 0.7R to the solidity at radial position 0.9R is larger than 1.8.

6. The wind turbine according to claim 1 wherein the ratio of solidity at radial position 0.5R to the solidity at radial position 0.9R is larger than 2.5.

7. The wind turbine according to claim 1 wherein the ratio of solidity at radial position 0.7R to the solidity at radial position 0.9R is larger than 3.0.

8. The wind turbine according to claim 1 wherein the rotor further comprises at least one blade having vortex generators.

9. The wind turbine according to claim 8 wherein the vortex generators are located at a radial position larger than 0.5R.

10. The wind turbine of claim 8 wherein the vortex generators are located at a radial position larger than 0.7R.

11. The wind turbine according to claim 8 wherein the blade has an airfoil at a radial position larger than 0.8R having a maximum lift coefficient of more than 1.6 when tested under 2-dimensional conditions and at a Reynolds number of 1.5 million and with the at least one vortex generator present.

12. The wind turbine according to claim 1 wherein the rotor further comprising a blade with an airfoil at a radial position larger than 0.8R having a maximum lift coefficient of more than 1.4 when tested under 2-dimensional conditions and at a Reynolds number of 1.5 million and with vortex generators removed if present.

13. A wind turbine of the fast runner type comprising:
a rotor having a diameter larger than 80 meters (m), and a blade with an airfoil at a radial position larger than 0.8 radius (R), the airfoil having a maximum lift coefficient of more than 1.4 when tested under 2-dimensional conditions and at a Reynolds number of 1.5 million and with vortex generators removed if present, wherein the ratio of the solidity at radial position 0.5R to the solidity at radial position 0.7R is larger than 1.5.

* * * * *